United States Patent [19]
Ono

[11] Patent Number: 5,979,511
[45] Date of Patent: Nov. 9, 1999

[54] FUEL FEEDING DEVICE

[75] Inventor: Nobuo Ono, Saitama, Japan

[73] Assignee: Honda Giken Kogyo Kabushiki Kaisha, Tokyo, Japan

[21] Appl. No.: 09/028,996

[22] Filed: Feb. 25, 1998

[30] Foreign Application Priority Data

Feb. 25, 1997 [JP] Japan .................................. 9-040961

[51] Int. Cl.⁶ .................................. B60S 5/02; B62J 35/00
[52] U.S. Cl. .......................... 141/59; 141/236; 141/290; 141/291; 141/326; 141/352; 137/588; 220/86.2; 220/562
[58] Field of Search .................................. 141/44, 45, 59, 141/290–294, 236, 302, 305, 308, 325, 326, 351–354; 137/588; 220/86.1, 86.2, 562

[56] References Cited

U.S. PATENT DOCUMENTS

| | | | |
|---|---|---|---|
| 917,155 | 4/1909 | Sanders | 141/293 |
| 1,894,655 | 1/1933 | Auchincloss | 220/86.1 |
| 3,618,643 | 11/1971 | Thomson | 141/302 |
| 3,807,433 | 4/1974 | Byrd | 141/290 |
| 5,186,224 | 2/1993 | Schirmacher | 141/293 |
| 5,213,142 | 5/1993 | Koch et al. | 141/59 |
| 5,234,038 | 8/1993 | Mitchell et al. | 141/293 |
| 5,297,585 | 3/1994 | Haile et al. | 141/59 |
| 5,738,380 | 4/1998 | Zipser et al. | 220/86.2 |

FOREIGN PATENT DOCUMENTS

| | | |
|---|---|---|
| 0487844A1 | 6/1992 | European Pat. Off. . |
| 0534752A1 | 3/1993 | European Pat. Off. . |
| 3-27869 U | 3/1991 | Japan . |

Primary Examiner—J. Casimer Jacyna
Attorney, Agent, or Firm—Birch, Stewart, Kolasch & Birch, LLP

[57] ABSTRACT

The fuel feeding device includes a fuel supplying tank, the exclusive nozzle for fuel connected to the lower portion of the fuel supplying tank and the nozzle, which also acts as an air releasing passage. When the fuel feeding device is pushed up over the fuel tank, the exclusive nozzle for supplying fuel and the nozzle which also acts as an air releasing passageway are opened or closed by the valves. Concurrently, the exclusive nozzle for fuel is applied as a fuel supplying passage and an inside area of the nozzle also acting as air releasing passageway is made such that about ⅓ of a sectional area of the passage is partitioned to make the air releasing passage and remaining about ⅔ of nozzle is applied as a fuel passage, where the fuel is supplied from it and at the same time air in the fuel tank is discharged out of the air releasing passage.

13 Claims, 9 Drawing Sheets

FUEL FEEDING DEVICE

BACKGROUND OF THE INVENTION

1. Field of the Invention

This invention relates to a fuel feeding device used for supplying fuel to a racing motorcycle.

2. Description of the Background Art

In Japanese Utility Model Laid-Open No. Hei 3-27869 a fuel feeding device is disclosed for feeding fuel to a fuel tank of a motorcycle.

This device is provided with two nozzles, i.e. one exclusive nozzle for fuel and the other exclusive nozzle for releasing air. The two nozzles have substantially the same diameter as each other. When each of the nozzles is inserted into feeding ports arranged separately at a fuel tank, a valve installed at the distal end of each of the nozzles abuts at a position adjacent to the feeding ports to close the clearance between the nozzle and the feeding ports. Concurrently, the valve is opened to feed fuel through the exclusive nozzle for fuel and air is removed from the exclusive nozzle for releasing air.

SUMMARY AND OBJECTS OF THE INVENTION

In view of the foregoing, it is desired in the aforesaid prior art to have an arrangement in which the exclusive nozzle for releasing air has approximately the same diameter as that of the exclusive nozzle for fuel, so that it is necessary to have a larger diameter for the exclusive nozzle for fuel if the fuel feeding time is to be shortened. In addition, the size of the nozzle is normally restricted and it is desired that a nozzle having approximately the same diameter as that of the prior art is applied to enable a fuel feeding time to be shortened.

In addition, in the prior art device for a fuel feeding tank, the exclusive nozzle for releasing air and the exclusive nozzle for fuel are each connected to a separate long fuel feeding hose and an air hose. This results in an integral assembly of these portions to each other even in a partial manner. However, it is still desired to realize an entire small-sized or lighter weight device.

In order to solve the aforesaid problems, the fuel feeding device of the present invention is made such that a fuel feeding nozzle connected to a fuel supplying tank is inserted from a feeding port of a fuel tank into it and fuel is fed under a state in which the feeding port and the fuel feeding nozzle are closed and characterized in that a fuel supplying passage and an air releasing passage are integrally arranged at said fuel supplying nozzle.

At this time, a plurality of feeding ports can be arranged, a plurality of fuel supplying nozzles can also correspondingly be arranged and at least one of the plurality of fuel supplying nozzles can be applied as a nozzle also acting as an air releasing nozzle having said fuel supplying passage and the air releasing passage integrally arranged and the other fuel supplying nozzles can be applied as nozzles exclusively used for fuel.

Further, the lower end of an opening for releasing air from the nozzles can be arranged at a higher location than the lower end of the fuel discharging port.

In addition, the bottom portion of the fuel tank is inclined downwardly to a rearward portion, a bulging-out portion projects downwardly and is arranged at a rear portion, a fuel supplying duct is connected at one end to the feeding port and is arranged within the fuel tank, the fuel supplying duct is curved and a distal end extends into the bulging-out portion.

Since the fuel supplying passage and the air releasing passage are integrally assembled in the fuel supplying nozzles, a remarkable effect can be attained in an entire small-sized device for providing a light weight device having an improved performance for supplying fuel.

In addition, in the case of applying a plurality of fuel supplying nozzles, it is satisfactory that at least one of the nozzles is applied as the nozzle also acting as one for releasing air, so that all other remaining fuel supplying nozzles are applied as exclusive nozzles for fuel. Thus, the per unit amount of time for supplying fuel can be increased and the time for supplying fuel can be substantially reduced.

Further, if the lower end of the opening for use in releasing air is installed at a higher location in the nozzle than that of the lower end of the fuel discharging port, a sufficient amount of fuel can be positively supplied while a timing of completion of feeding fuel is not set too fast due to the fact that this timing of completion in the feeding operation is judged at the time when the fuel flows in a reverse direction from the exclusive nozzles for releasing air.

Further, the bottom portion of the fuel tank is inclined downwardly toward a rear portion of the fuel tank, thereby a bulging-out portion projecting downwardly is provided at the rear portion and concurrently if the fuel supplying duct installed in the fuel tank is curved from the feeding port towards the bulging-out portion, fuel can be smoothly guided to the bulging-out portion and the fuel can be supplied without being substantially influenced by producing bubbles.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Figure 1:
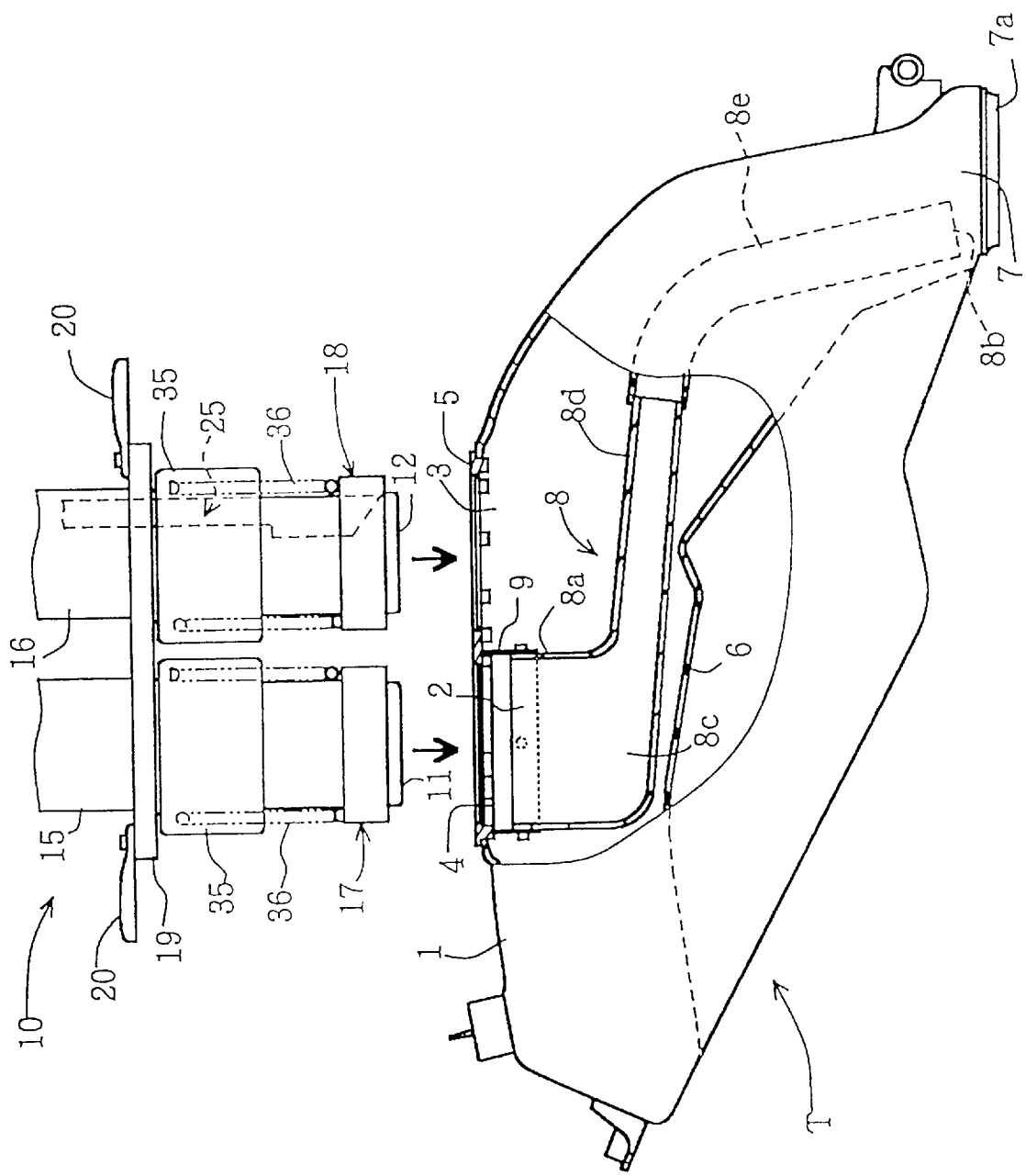
FIG. 1 is a sectional view for showing a fuel tank.

FIG. 1 is a sectional view illustrating a fuel tank for a racing motorcycle just before starting to supply fuel to a fuel tank T. The fuel tank T is provided with two feeding ports 2, 3 having substantial the same diameter at a top portion 1 in a front side and a rear side, respectively. Fittings 4, 5 are fixed to each of the openings of the feeding ports 2, 3.

At the bottom portion of the fuel tank T a bulging-out section 7 is formed at its rear portion by inclining the bottom portion 6 downwardly in a rearward direction. The bulging-out section 7 projects in a downward length-wise direction as it approaches a rearward portion. A fuel supplying port, not shown in FIG. 1, is fixed to a lower-most section 7a, wherein fuel is also supplied to an engine, not shown in FIG. 1, from this location.

In turn, to the front fitting 4 is connected an upper end 8a of the fuel supplying duct 8 through feeding position restricting rings, its lower end side extends in a rearward direction while being curved along the bottom portion 6 and its lower end portion 8b reaches near the lower-most portion 7a of the bulging-out section 7.

In this case, the fuel supplying duct 8 includes an upper half-section 8c formed in a substantial L-shape and a curved hose 8e connected to the rear end portion of the rearward extending section 8d.

The exclusive nozzle 11 for supplying fuel from the fuel feeding device 10 and the nozzle 12, also acting for releasing air, are each inserted into respective feeding ports 2 and 3. In this way, at the feeding port 2, only fuel is fed from the exclusive nozzle 11 for supplying fuel to the bulging-out section 7 through the fuel supplying duct 8. In turn, at the feeding port 3, air in the fuel tank T is discharged to an external section of the air releasing passage 25 in concurrence with the feeding of fuel from a portion of the nozzle 12 which also acts for releasing air.

Figure 2:
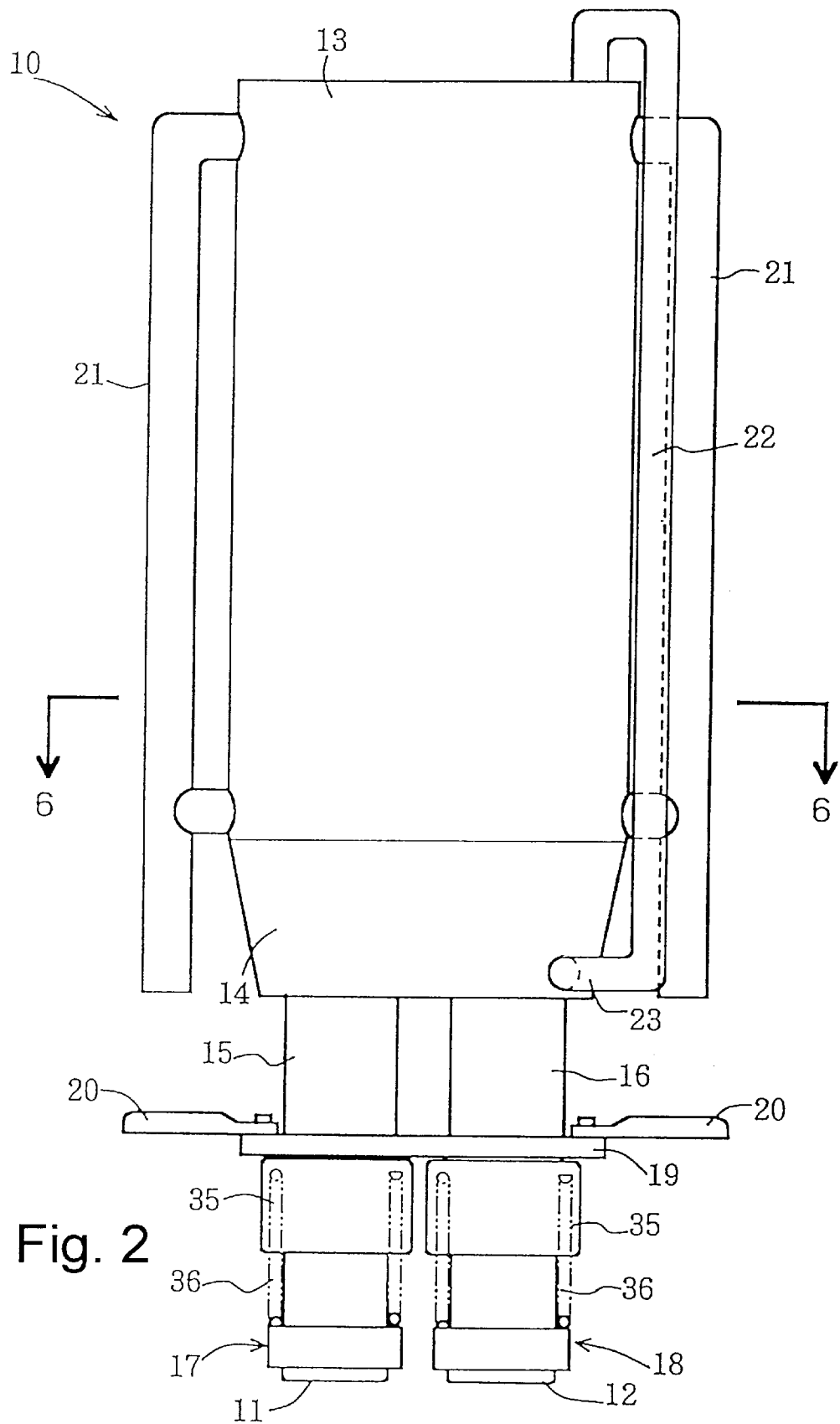
FIG. 2 illustrates a front elevational view of an outer appearance of a fuel feeding device.
Figure 3:
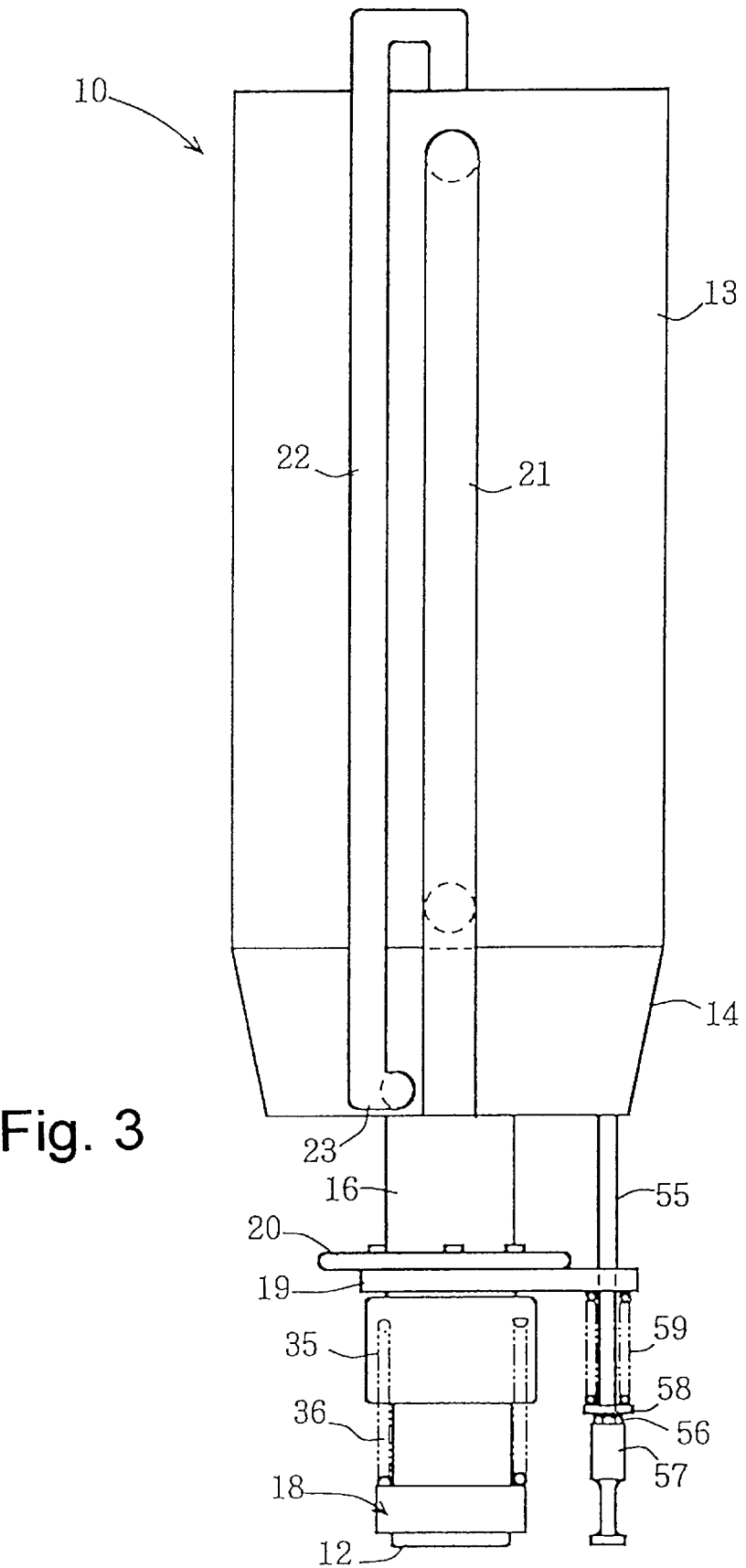
FIG. 3 is a side elevational view of FIG. 2

As is apparent from FIGS. 2 and 3, the fuel feeding device 10 includes a movable type fuel supplying tank 13 in which fuel is pressurized and stored and the exclusive nozzle 11 for fuel and the nozzle 12, also acting as an air releasing passage, are connected through two hoses 15, 16 extending downwardly from the lower section 14 of the tank as fuel supplying nozzles.

Each of valves 17, 18 is slidably arranged at an outer circumferential section of each of the respective exclusive nozzle 11 for supplying fuel and the nozzle 12, also acting as an air releasing passage, and the exclusive nozzle 11 for supplying fuel and the nozzle 12, also acting as an air releasing passage, are fixed to the connecting plate 19 at a predetermined interval.

To both ends of the connecting plate 19 are fixed grips 20 which are held by a user's hand during fuel supplying operation so as to be entirely pushed down, where grip bars 21 extending in a vertical direction are arranged at symmetrical side positions of the fuel supplying tank 13 and an air pipe 22 is arranged along one side of the grip bar 21.

The air pipe 22 is directed from the top section of the fuel supplying tank 13 in a downward direction, a bent portion 23 enters the lower section 14 of the fuel supplying tank 13 and is connected to the air releasing passage 25 in the nozzle 12 also acting as the air releasing passage through a hose (to be described later).

Figure 4:
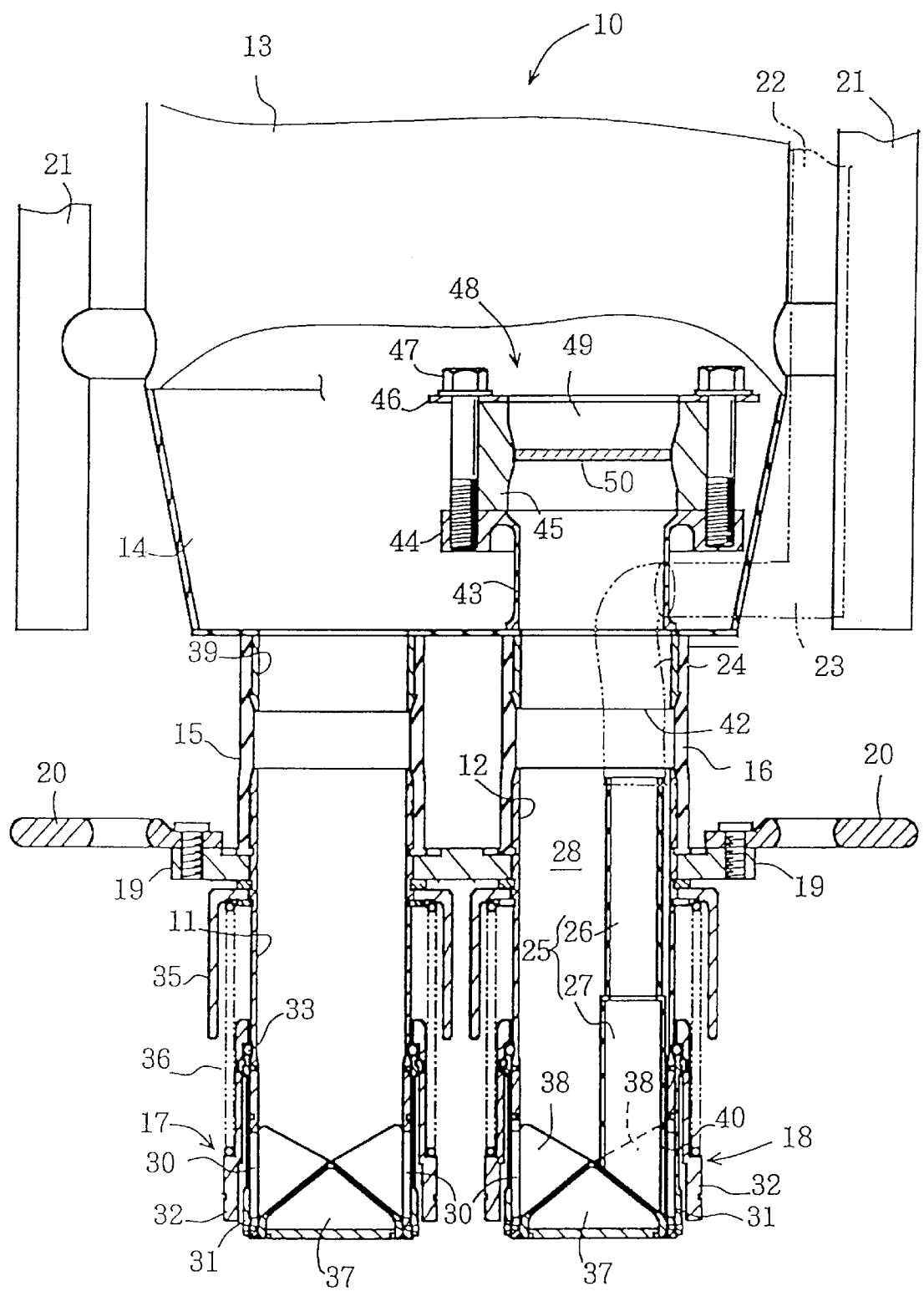
FIG. 4 is an expanded sectional view taken along a line 4—4 of FIG. 6 illustrating a fuel supplying nozzle.

As is apparent from FIG. 4, a side surface of the distal end of the exclusive nozzle 11 for supplying fuel is formed with a fuel discharging port 30, and this is covered by an inner cylinder 31 of the valve 17.

The valve 17 is provided with an inner cylinder 31 and an outer cylinder 32 forming a double-wall at its outer circumferential side and when a feeding operation is carried out, the outer circumference of the extremity end of the inner cylinder 31 is closely contacted with the inner circumferential surface of the fitting 4. The distal end surface of the outer cylinder 32 is placed at a position abutting against the upper surface of the fitting 4 of the feeding port 2.

The inner cylinder 31 and the outer cylinder 32 are integrally assembled to each other and slidable on an outer circumference of the exclusive nozzle 11 for supplying fuel. A ring 33 is arranged at the inner circumferential side of the upper section and is engaged with a click groove 34 formed at the outer circumferential side of the exclusive nozzle 11 for supplying fuel at the valve closed position where it is moved to the lower-most location (similar to the above).

When the valve 17 is moved upwardly, i.e. when the valve is opened, its upper section enters a fixed cylinder 35 and it is biased in a closing direction by a return spring 36 resiliently installed between the fixed cylinder 35 and the outer cylinder 32.

A cap member 37 having a peaked shaped section is fitted to the distal end of the exclusive nozzle 11 for supplying fuel. The fuel smoothly flows through this slant surface toward the fuel discharging port 30 formed at the side surface of the distal end.

A joint pipe 39 projects from and is formed at the bottom portion of the lower section 14. The joint pipe 39 is fitted to the upper portion of the hose 15 to which the upper end of the exclusive nozzle 11 for supplying fuel is fitted.

The nozzle 12, which also acts as an air releasing passage, has substantially the same structure as that described above except for the structure of the valve 18. The sections of the nozzle, common to that of the exclusive nozzle 11, for fuel are denoted by the same reference numerals and their description will be eliminated.

Figure 6:
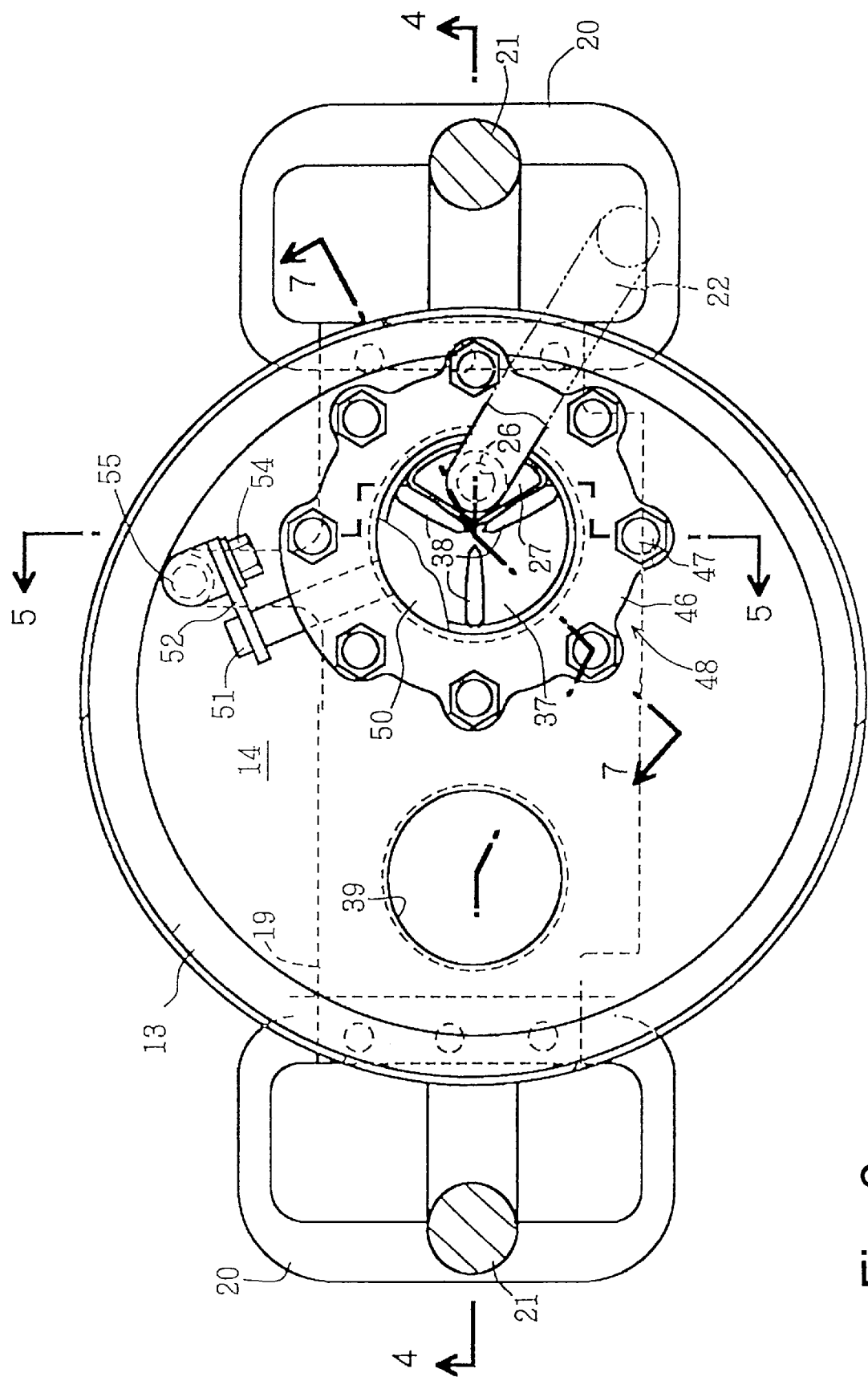
FIG. 6 is an expanded sectional view taken along a line 6—6 of FIG. 2.

The distal end of the nozzle 12, which also acts as an air releasing passage, is partitioned by a partition wall 38 of the cap member 37 into three sections (refer to FIG. 6). One of the three openings may act as an opening 40 for releasing air and the other remaining openings may act as fuel discharging ports 30.

An air releasing passage 25 is in communication with the opening 40 for releasing air, and a fuel passage 28 is in communication with the fuel discharging port 30, thereby an inner side of the nozzle 12, which also acts as an air releasing passage, is separated into the air releasing passage 25 forming about ⅓ of the total area of the passage and the fuel passage 28 forming about ⅔.

A joint pipe 42 projects downwardly from the lower section 14, in the same manner as that of the joint pipe 39 of the exclusive nozzle 11, for suplying fuel. The joint pipe 42 is fitted to the upper portion of the hose 16 to which the upper end of the nozzle 12, which also acts as an air releasing passage, is fitted.

Figure 5:
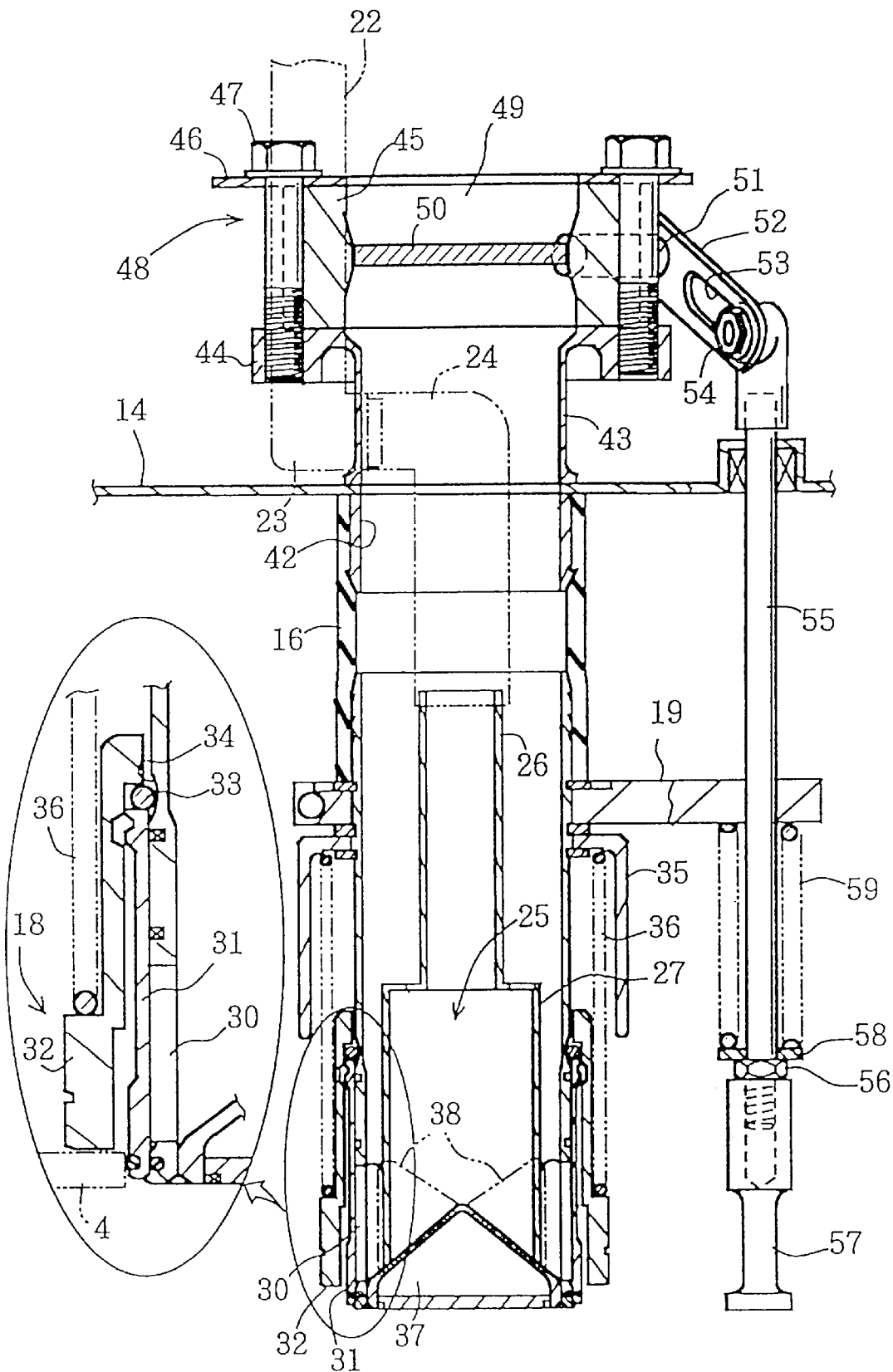
FIG. 5 is an enlarged sectional view taken along a line 5—5 of FIG. 6 illustrating a nozzle also acting for releasing air and a side elevational view of the operation of FIG. 2 and its adjoining section.

As is apparent from FIG. 5, a flange pipe 43 is in communication with the joint pipe 42 and abuts on the bottom surface of the lower section 14 at its lower end and is welded thereto. An upper portion of the flange pipe 43 is provided with a flange portion 44.

A valve cylinder 45 overlaps the flange portion 44 and a pushing plate 46 overlaps on the valve cylinder 45 which is connected to the flange portion 44 with bolts 47, thereby a housing 48 for an auxiliary valve having the three members integrally fixed with the valve cylinder 45 and being held thereby is attained.

Within this housing 48 for the auxiliary valve is formed an auxiliary valve passage 49 for communicating fuel in the fuel supplying tank 13 from the joint pipe 42 with the fuel passage 28 is arranged inside the nozzle 12, which also acts as an air releasing passage.

The end portion of the bent section 23 projects through the lower section 14 of the fuel supplying tank 13 in the air pipe 22 and projects through the side surface of the flange pipe 43, where it is connected to the upper end of the hose 24.

The air releasing passage 25 includes a cylindrical upper portion 26 and a lower portion 27 formed to have a substantially fan-shaped section, where the upper portion 26 is connected to the lower end of the hose 24 and the lower portion 27 is formed in a section in communication with the opening 40 for providing an air releasing passage partitioned by the partition wall 38 of the cap member 37.

Figure 7:
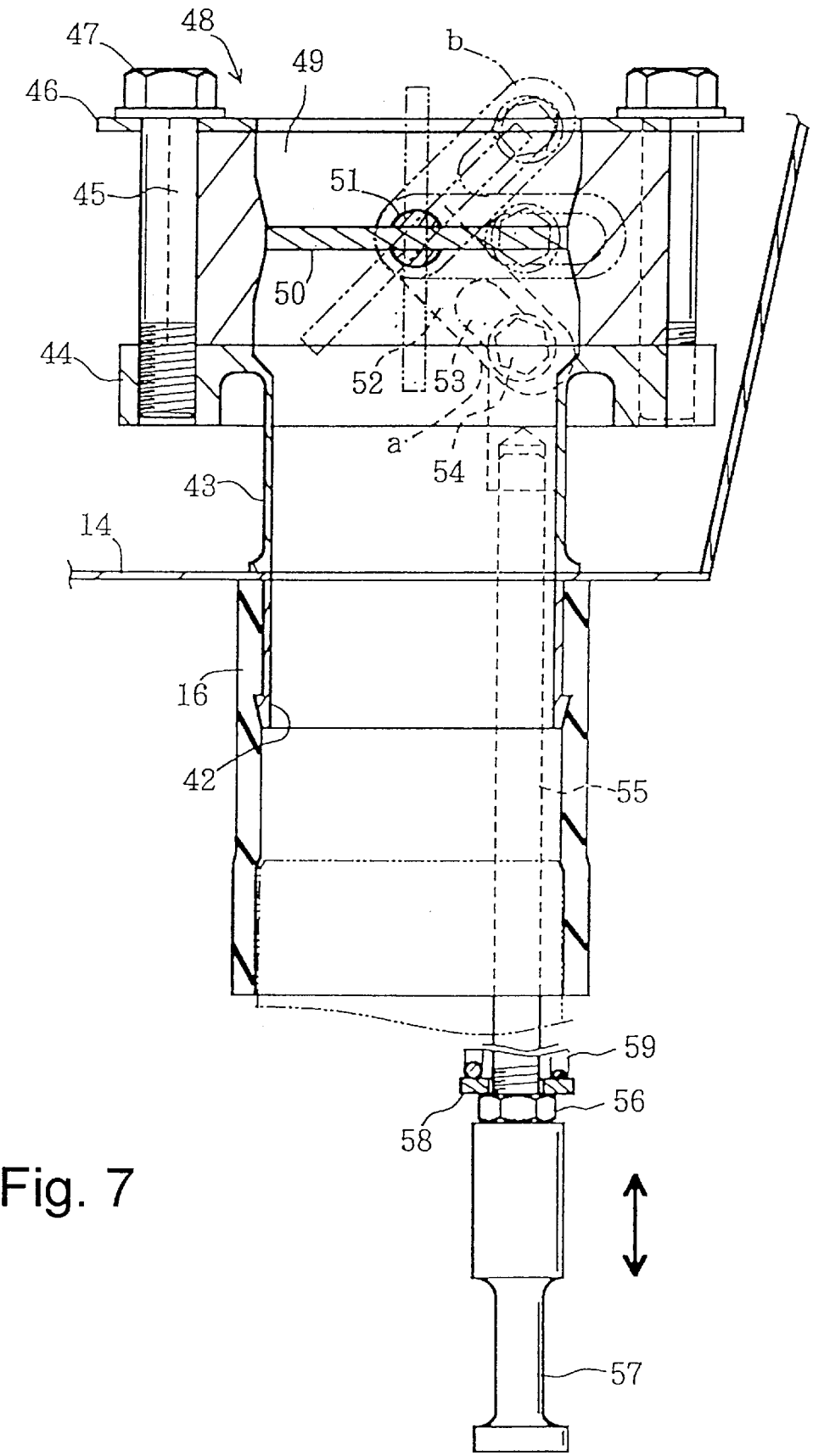
FIG. 7 is a substantial sectional view taken along a line 7—7 of FIG. 6 illustrating an auxiliary valve portion.

As is apparent from FIGS. 5 to 7, an auxiliary valve 50 for opening or closing the auxiliary valve passage 49 is formed inside the valve cylinder 45 and is arranged within the valve cylinder 45. The auxiliary valve 50 is formed as a flat valve with a rotating shaft 51 for integrally rotating the auxiliary valve 50 which passes through the valve cylinder 45 and projects to the side portion thereof.

One end of a ring plate 52 is connected to the projecting end of the rotating shaft 51, the other end of the ring plate 52 is formed with an elongated hole 53. The upper end of the rod 55 is connected by a bolt 54 through this elongated hole 53.

A state (a) shown by a dotted line in FIG. 7 is a furl-closed state of the flat valve 50 in which a rod 55 is lowered in a downward direction. The ring plate 52 is rotated in a clockwise direction to shut off the supply of fuel from the fuel supplying tank 13. If the rod 55 is raised upwardly, the ring plate 52 is rotated in a counter-clockwise direction as indicated by an imaginary line and soon the flat valve 50 indicated by the imaginary line (b) becomes a furl-opened state and fuel is supplied to the fuel supplying passage 28.

The rod 55 extends in a vertical direction and its intermediate portion is supported by the connecting plate 19 in such a way that it may be moved up and down. A lower end of the rod 55 is an abutting portion 57 secured to the rod 55 by an adjustment nut 56. This abutting portion 57 abuts against the top portion of the fuel tank T when its lower end pushes down each of the fuel supplying nozzles (11, 12) into the feeding ports 2, 3 so as to push up the ring plate 52.

The position of the abutting portion 57 is adjusted with such a timing as one in which the flat valve 50 can be fully opened in concurrence with a fall-opened state of the valve 18. When the abutting portion 57 is not contacted with the side of the fuel tank, the rod 55 is lowered by the return spring 59 and the ring plate 52 is also rotated to cause the flat valve 50 to be full closed.

An action of the preferred embodiment of the present invention will be described. When each of the distal ends of the exclusive nozzle 11 for the fuel and the nozzle 12, which also acts as an air releasing passage, coincides with each of the fittings 4, 5 of the feeding ports 2, 3 and the grip 20 is held by a user's hand to push down the fuel feeding device 10, the distal end of the outer cylinder 32 of each of the valves 17, 18 abuts against the upper surfaces of the fittings 4, 5 and then an outer circumference of the distal end of each of the inner cylinders 31 is closely in contact with the inner circumferential surface of each of the fittings 4, 5.

As the fuel feeding device 10 is depressed further under this condition, each of the distal ends of exclusive nozzle 11 for supplying fuel and the nozzle 12, which also acts as an air releasing passage, is inserted into the fuel tank T through the feeding ports 2, 3 and at the same time each of the valves 17, 18 is pushed up against the return spring 36 and fully opened.

With such an arrangement as above, at the side of the exclusive nozzle 11 for supplying fuel, the fuel within the fuel supplying tank 13 passes through the fuel discharging port 30 of the exclusive nozzle 11 for supplying fuel and the fuel is fed into the fuel supplying duct 8.

In turn, at the nozzle 12, which also acts as an air releasing passage, the abutting portion 57 is pushed up through its contact with the fuel tank side in concurrence with the opening operation of the valve 18 to open the auxiliary valve 50, resulting in a supply of fuel is also fed into the fuel tank through the fuel discharging port 30 of the nozzle 12, which also acts as an air releasing passage.

At this time, air pushed up by the liquid surface within the fuel tank as fuel is supplied into the fuel tank flows from the air releasing opening 40 through the air releasing passage 25 and the air pipe 22 and is returned into the top portion of the fuel supplying tank 13.

Thus, the fuel can be smoothly supplied and the amount of fuel supplied per unit time is remarkably increased as compared with that of the prior art due to the fact that approximately ⅔ of the nozzle 12 and the entire exclusive nozzle 11 for fuel are used for supplying fuel. In addition, the sectional area of the passage of the nozzle 12, which also acts as an air releasing passage, results in a fuel supplying time that can be substantially shortened.

In addition, since it is satisfactory that each of the diameters of the exclusive nozzle 11 for supplying fuel and the nozzle 12, which acts as an air releasing passage, is approximately the same value and has a similar diameter of that of the prior art, it becomes possible to shorten the fuel supplying time without increasing the diameter of the fuel supplying nozzle.

In addition, since it is satisfactory that each of the diameters of the feeding ports 2 and 3 can be kept at the same value as that of the prior art, the feeding ports 2 and 3 may be used with the existing fuel tanks. It is not necessary to change a diameter of the feeding ports with respect to the fuel tank.

In addition, it is not necessary to provide a separate arrangement for the fuel supplying hose connected to the fuel supplying nozzle end and for the air hose connected to the air releasing nozzle as found in the prior art system. Thus, the entire device can be made small in size and light in weight.

Further, the bottom portion of the fuel tank is formed to be bulged-out more downwardly as it extends rearwardly eventhough the fuel supplying duct 8 is curved in such a way as it reaches the bulged-out portion 7. This results in the fuel supplied from the exclusive nozzle 11 for fuel to be fed to the lower-most portion of the bulged-out portion 7. Thus, the influence of bubbles at the exclusive nozzle 11 for supplying fuel, which supplies a large amount of fuel, is reduced to enable a smooth fuel supplying operation to be carried out.

However, it is also possible to arrange at the nozzle 12, which also acts as an air releasing passage, the fuel supplying duct to be connected only to the fuel discharging port 30 except for the air releasing opening 40 of the openings formed at its distal end.

Figure 8:
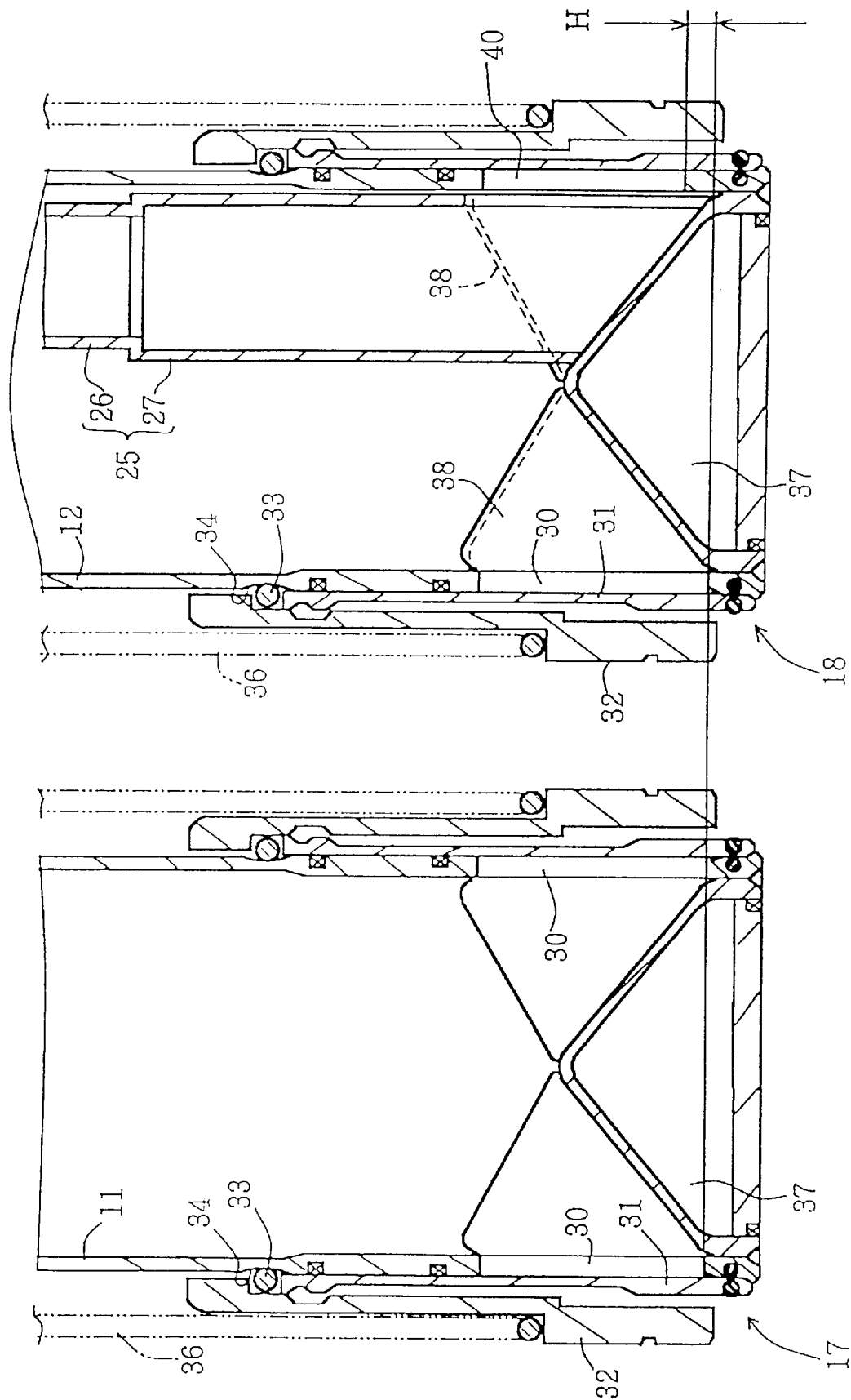
FIG. 8 is a view corresponding to FIG. 3 illustrating the fuel supplying nozzle of another preferred embodiment.

FIG. 8 is a view corresponding to FIG. 3 showing another preferred embodiment. In this example, the arrangement in which only the air releasing opening 40 in the openings formed at the distal end of the nozzle 12, which also acts as an air releasing passage, is formed at a higher position than that of the fuel discharging port 30 only by a distance H which is different from that described above. Other provisions coincide with those of the former preferred embodiment, so that the common provisions are denoted by the same reference numerals and their description is eliminated.

In this way, due to the relationship that a timing of completion of feeding fuel is discriminated at the time when fuel flows in a reverse direction from the nozzle 12, which also acts as an air releasing passage, this discrimination is not performed too fast and a sufficient amount of fuel can be supplied in a positive manner.

Figure 9:
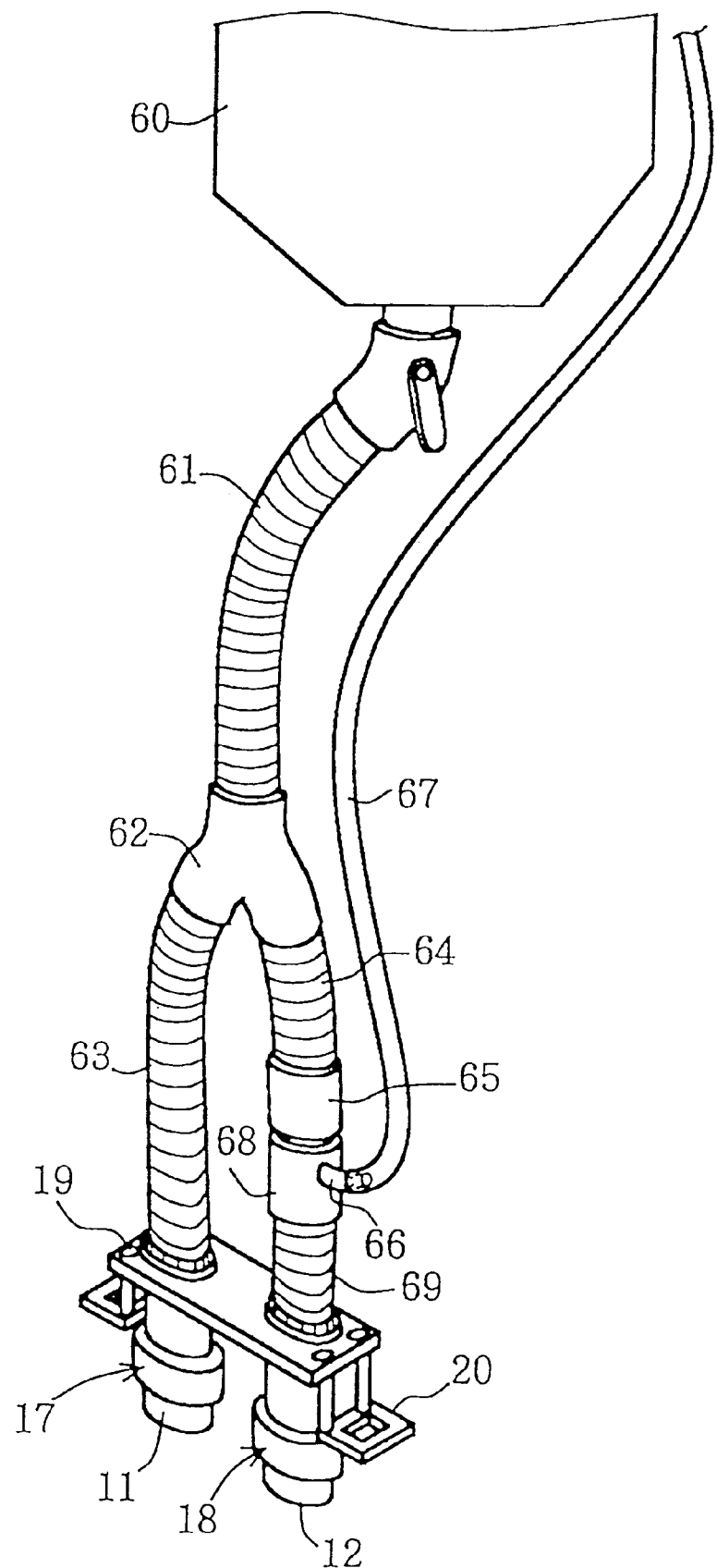
FIG. 9 is an outer appearance perspective view illustrating an entire device of a still further preferred embodiment.

FIG. 9 is a view illustrating an outer appearance of an entire fuel feeding device in accordance with a still further preferred embodiment. In this example, the fuel supplying tank 60 is fixed at an upper location, one complex hose 61 extends downwardly from a bottom section and is branched at a three-way joint 62 to a branched exclusive hose 63 for supplying fuel and an air releasing branched hose 64, respectively.

Each lower section of the exclusive branched hose 63 for supplying fuel is connected to the exclusive nozzle 11 for fuel similar to that of the former. In addition, each lower section of the air releasing branched hose 64 is connected, through a valve cylinder 65, a joint section 68 and a distal end pipe 69, to the nozzle 12 also acting for releasing air in a similar manner to that of the former preferred embodiment.

Within the valve cylinder 65 is arranged a fuel feeding start valve having an appropriate configuration with the same structure or having a similar function as or to that of the auxiliary valve of the former preferred embodiment. An air releasing joint pipe 66 is arranged at its lower side joint section 68.

A section at one end of the joint pipe 66 is placed in the joint portion 68 and the distal end pipe 69 is in communication with the air releasing opening at the distal end of the nozzle 12, which also acting as an air releasing passage, through a hose and an air releasing passage in the same manner as that of the former preferred embodiment. The other end of the joint pipe 66 is returned back into the fuel supplying tank 60 through the air releasing hose 67.

Since a section between the fuel supplying tank 60 and the three-way joint 62 can be set as one complex hose 61 even in such an arrangement as described above, a small-sized and light weight system can be realized and fuel can be supplied not only from the exclusive branched hose 63 for supplying fuel but also from a system branched to the air releasing side branched hose 64, some effects similar to those of the former preferred embodiment can be attained.

The present invention is not limited to these preferred embodiments, but various kinds of preferred embodiments can be attained, and for example, each of the fuel supplying nozzle and the feeding ports can be individually arranged. In addition, the fuel supplying nozzle can be constructed as the aforesaid nozzle also acting as the air releasing passage.

To the contrary, it is possible to arrange more than three fuel supplying nozzles and feeding ports and in the case where a plurality of fuel supplying nozzles are installed, more than two or all of the nozzles can be applied as the nozzles also acting as air releasing passages.

The invention being thus described, it will be obvious that the same may be varied as a departure from the spirit and scope of the invention, and all such modifications as would be obvious to one skilled in the art are intended to be included within the scope of the following claims.

We claim:

1. A fuel feeding device comprising:
 a fuel source;
 a plurality of fuel supplying passages in communication with said fuel source;
 a plurality of fuel feeding nozzles being in communication with said fuel source;
 a plurality of feeding ports for receiving said plurality of fuel feeding nozzles; and
 an air releasing passage being integrally arranged in at least one of said plurality of fuel supplying nozzles acting to release air received therein, wherein said fuel supplying passage and the air releasing passage thereof are integrally arranged and additional fuel supplying nozzles are applied as nozzles exclusively used for fuel.

2. The fuel feeding device according to claim 1, wherein a lower end of an opening for releasing air of said at least one of said plurality of nozzles is arranged at a higher location relative to a lower end of a fuel discharging point.

3. The fuel feeding device according to claim 1, wherein a lower end of an opening for releasing air of said at least one of said plurality of nozzles is arranged at a higher location relative to a lower end of a fuel discharging port.

4. The fuel feeding device according to claim 1, wherein said plurality of feeding ports includes a fuel tank being integral therewith, the bottom portion of said fuel tank is inclined downwardly to a rearward portion, a bulging-out portion projects downwardly and is arranged at a rear portion, a fuel supplying duct is connected, at one end, to the feeding port arranged within the fuel tank, the fuel supplying duct is curved and a distal end extends into said bulging-out portion.

5. A fuel feeding device comprising:
 a fuel supplying tank;
 a fuel tank; and
 a plurality of fuel supplying nozzles are provided in communication with said fuel supplying tank, at least one of said plurality of fuel supplying nozzles is a nozzle also acting to release air from said fuel tank, and another of said plurality of fuel supplying nozzles is a nozzle exclusively used for supplying fuel.

6. The fuel feeding device according to claim 5, wherein a lower end of an opening for releasing air of said at least one nozzle is arranged at a higher location relative to a lower end of a fuel discharging port.

7. The fuel feeding device according to claim 5, wherein said at least one and another nozzles supply fuel to said fuel tank wherein the bottom portion of the fuel tank is inclined downwardly to a rearward portion, a bulging-out portion projects downwardly and is arranged at a rear portion, a fuel supplying duct is connected, at one end, to a feeding port arranged within the fuel tank, the fuel supplying duct is curved and a distal end extends into said bulging-out portion.

8. The fuel feeding device according to claim 5, wherein a first closure valve is operatively connected to a lower end of said another nozzle and a second closure valve is operatively connected to a lower end of said at least one nozzle, said first and second closures being normally positioned in a closed position and being selectively opened to permit fuel to be discharged from said fuel supplying tank.

9. The fuel feeding device according to claim 8, and further including an auxiliary valve disposed in said at least one nozzle for selectively closing said at least one nozzle and being selectively manually opened to permit fuel to flow from said fuel supplying tank.

10. The fuel feeding device according to claim 9, wherein said auxiliary valve is actuated by an abutting portion that moves to impart movement to said auxiliary valve when fuel is to be discharged from said fuel supplying tank.

11. The fuel feeding device according to claim 5, wherein ⅓ of said at least one nozzle is designated for venting air and ⅔ of said at least one nozzle is designated for discharging fuel from the fuel supplying tank.

12. The fuel feeding device of claim 5, wherein said at least one nozzle includes a first passageway in communication with said fuel supplying tank for venting air while fuel is discharged from said fuel supplying tank, said at least one nozzle including a second passageway being in communication with said fuel supplying tank for also discharging fuel therefrom, wherein said first and second passageways are integrally arranged and additional fuel supplying nozzles are applied as nozzles exclusively used for fuel.

13. The fuel feeding device according to claim 12, wherein a lower end of an opening for releasing air of said at least one nozzle is arranged at a higher location relative to a lower end of a fuel discharging port.

* * * * *